(12) United States Patent
Ferrarini et al.

(10) Patent No.: US 11,807,839 B2
(45) Date of Patent: Nov. 7, 2023

(54) PLANT AND PROCESS FOR OBTAINING CLEAR MUST FROM GRAPES AND FOR VINIFICATION

(71) Applicant: ALFA LAVAL CORPORATE AB, Lund (SE)

(72) Inventors: Roberto Ferrarini, Lund (SE); Carole Rapilly, Castellina in Chianti (IT); Marco Franzoso, Segrate (IT)

(73) Assignee: ALFA LAVAL CORPORATE AB, Lund (SE)

( * ) Notice: Subject to any disclaimer, the term of this patent is extended or adjusted under 35 U.S.C. 154(b) by 48 days.

(21) Appl. No.: 17/112,444

(22) Filed: Dec. 4, 2020

(65) Prior Publication Data

US 2021/0139823 A1 May 13, 2021

Related U.S. Application Data

(62) Division of application No. 15/104,860, filed as application No. PCT/IB2014/067236 on Dec. 22, 2014, now abandoned.

(30) Foreign Application Priority Data

Dec. 23, 2013 (IT) .......................... MI2013A002197

(51) Int. Cl.
*C12G 1/02* (2006.01)
*C12G 1/022* (2006.01)
(Continued)

(52) U.S. Cl.
CPC ............. *C12G 1/0203* (2013.01); *A23N 1/02* (2013.01); *C12G 1/005* (2013.01); *C12G 1/02* (2013.01)

(58) Field of Classification Search
CPC .................................................. C12G 1/0203
See application file for complete search history.

(56) References Cited

U.S. PATENT DOCUMENTS

| 5,656,180 A | 8/1997 | Pieralisi |
| 2004/0035296 A1 | 2/2004 | Schauz et al. |
(Continued)

FOREIGN PATENT DOCUMENTS

| CH | 622 820 A5 | 4/1981 |
| EP | 0 321 666 A1 | 6/1989 |
(Continued)

OTHER PUBLICATIONS

"Flottweg Processing Technology for the Production of Fruit and Vegetable Juices From Fruit to Juice", Flottweg Separation Technology, Dec. 20, 2014, 16 pages.
(Continued)

*Primary Examiner* — Peter Keyworth
(74) *Attorney, Agent, or Firm* — Birch, Stewart, Kolasch & Birch, LLP

(57) ABSTRACT

A process for obtaining clear must from grape berries includes feeding grape berries into a plant, controlled addition of adjuvant and/or clarifying substances to said grape berries while the grape berries are still at least partially intact, centrifuging said grape berries, in such a way as to separate the liquid phase or must from the solid phase with at least one centrifugal separator device, extracting and collecting the solid phase in a respective storage container and settling and/or flotation of the liquid phase or must so that the liquid phase of said must and the solid residue are separated.

19 Claims, 1 Drawing Sheet

(51) Int. Cl.
*C12G 1/00* (2019.01)
*A23N 1/02* (2006.01)

(56) References Cited

U.S. PATENT DOCUMENTS

| 2008/0026100 | A1 | 1/2008 | Villa et al. |
| 2013/0105402 | A1 | 5/2013 | Schauz et al. |
| 2015/0140166 | A1 | 5/2015 | Escudier et al. |

FOREIGN PATENT DOCUMENTS

| EP | 0 331 699 A1 | 9/1989 |
| WO | WO 89/02707 A1 | 4/1989 |
| WO | WO 91/05847 A1 | 5/1991 |
| WO | WO 01/57177 A1 | 8/2001 |
| WO | WO 2013/045865 A1 | 4/2013 |

OTHER PUBLICATIONS

"Production of Grape Juice with Separators and Decanters", GEA Westfalia Separator Group, Nov. 4, 2013, 2 pages.
"Separators, Decanters and Process Lines from GEA Westfalia Separator for Citrus Processing", GEA, Dec. 20, 2014, 40 pages.
Extended European Search Report, dated Jun. 12, 2017, for European Application No. 17161005.8.
Ferrarini et al., "Importance des charges électriques superficielles des adjuvants œnologiques des particules et des colloïdes présents dans les moûts et les vins", Revue Française d'œnologie—Cahier Scientifique, 1996, vol. 158, 13 pages.
Ferrarini et al., "Messa a punto di metodi per la valutazione mediante streaming current detector delle cariche elettriche superficiali delle particelle e dei colloidi di interesse enologico", 2nd National Congress on Food Chemistry, Giardini Naxos, May 24-27, 1995, Proceedings, 1995, pp. 223-230.
Ferrarini et al., "Recent advances in the process of flotation applied to the clarification of grape musts", Journal Of Wine Research, 1995, vol. 6, No. 1, pp. 19-33.

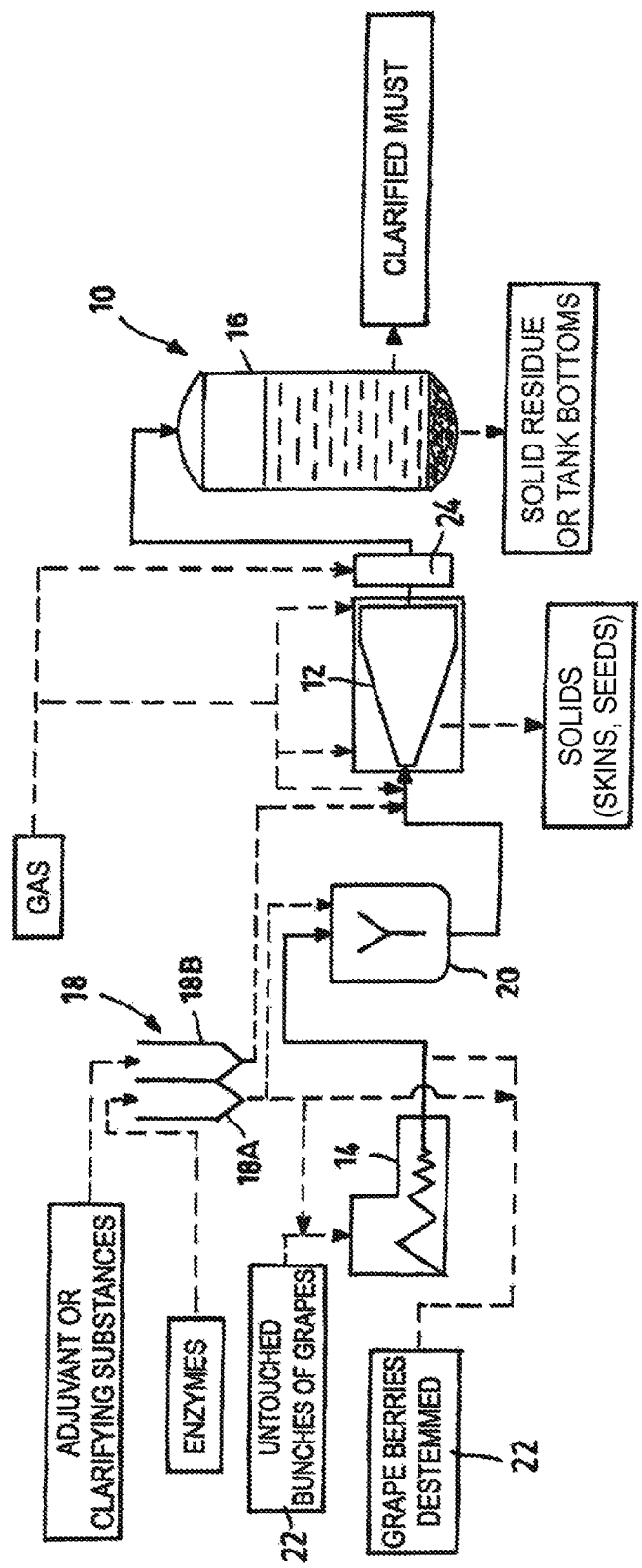

PLANT AND PROCESS FOR OBTAINING CLEAR MUST FROM GRAPES AND FOR VINIFICATION

CROSS REFERENCE TO RELATED APPLICATIONS

This application is a Divisional of copending application Ser. No. 15/104,860, filed Jun. 15, 2016, which is the National Phase under 35 U.S.C. § 371 of International Application No. PCT/IB2014/067236, filed on Dec. 22, 2014, which claims benefit to MI2013A002197, filed in Italy on Dec. 23, 2013, the disclosures of which are expressly incorporated by reference into the present application.

FIELD OF THE INVENTION

The present invention refers to a plant and to a vinification process or, more precisely, to a plant and to a process for obtaining clear must or wine from grapes.

BACKGROUND OF THE INVENTION

As known, vinification is the biochemical and technological process of transforming grapes into wine and the refining thereof. In the case of processing white wine and sometimes rose wine, conventional procedures of processing the grape for obtaining must to be sent to fermentation normally foresee a first destemming and pressing step, which consists of the separation of the grapes from the stem, and a second pressing step, which allows most of the must present in the pulp of the grape berry to come out.

Then there is a separation step of the "vinasse" (skin and pips) and an extraction step of the must left in them. This operation is articulated, according to the conditions (pressure), into three steps that can be actuated by one or more machines:
1. straining, that consists of extracting the must from the solid parts without applied pressure; it can be static or dynamic, as a function of whether there is or is not movement of the crushed grapes during the operation and, in in this last case, continuous or discontinuous; the must obtained with this operation, with low mechanical impact on the plant matrix, is good quality and is defined "free-run must"; the straining operation can be carried out by specific machines, or also during the first crushing steps, when the extraction of the must continues without applying overpressure;
2. crushing, which follows the straining and that consists of extracting must from the solid parts with the limited aid of pressure (maximum 2-3 bars); also in this case the technologies can be continuous or discontinuous; the latter, especially if of the pneumatic type, are more suitable for obtaining high quality must; the first fractions of must obtained at low pressure are still considered "free-run must", whereas the following fractions, constitute the "press-must", which are generally intended for the production of low/average quality wines;
3. pressing, which follows the pressing and that consists of extracting the residual must that is present in the solid parts with the aid of higher pressure; the musts thus obtained ("pressed") are generally intended for the production of semi-finished goods such as "preserved musts" so as to then be transformed into RCM (acronym of "rectified concentrated must").

These separation/extraction technologies of the must are also used in processing red wines for separating the must, after warm fermentation, and for separating wine, after fermentation carried out in the presence of solid parts (skin and pips).

The must thus obtained can undergo a possible step of sediment removal, i.e. the separation of the particulate present in the must, such as to allow a clear must to be obtained with values of turbidity that are indicatively lower than 200-300 NTU (Nephelometric Turbidity Units), or in any case lower than 1.5% by weight of solids in suspension, considered optimal for the production of good quality white wines. The methods foreseen for removing the sediment are generally sedimentation and flotation, static or dynamic, or less frequently filtration with rotary vacuum filters and centrifugation. The sediment removal operation can be helped with the use of enzymes and/or clarifying substances. In the case of sedimentation and of flotation, the must contained in the sediment is further separated with systems that are suitable for operating with high solid content (press filters, vacuum rotary filters, decanters, etc.).

In some cases, in the production of white and rose wines, such operations are preceded by a maceration step so-called "skin contact", carried out also at temperatures that are lower than room temperature (cold maceration or cryomaceration). The clear must in any case obtained is thus intended for alcoholic fermentation, in general managed at a controlled temperature.

In the case of the production of red wines it is always foreseen for there to be, after the destemming and the pressing, a maceration step that can be simultaneous to the fermentation (conventional red vinification), or it can be separated and prior to the alcoholic fermentation (thermovinification, "flash détente" and variants thereof, carbonic maceration or yet more). Then, in the case of the production of red wines, the separation of the solid parts (skin and pips) can be carried out before the fermentation in the case in which there has been some sort of maceration of the grape, or after alcoholic fermentation (vinification in conventional red): said separation is obtained with machines and technologies that are the same as those described for separating/extracting the must for the production of white wines.

All wines, white and red, after alcoholic fermentation require one or more decanting operations, often operating with decanting in tank and possibly with the addition of clarifying substances. The sediment (vinasse) is further filtered with special filters (plate or vacuum filters), or through disc centrifuges or continuous centrifuges with horizontal axis, called decanters. From this operation a "sediment wine" and a semi-solid sediment are obtained intended for distillation.

Vinification processes of the known type described above usually require plants in which it is necessary to manage and control numerous machines and technologies that are different from one another. Vinification plants of the known type are disclosed, for example, in documents CH 622 820 A5 and WO 91/05847 A1. Specifically, the separation/extraction processes of the must (crushing, strain-pressing) are complex, costly, require high labour for managing and cleaning and are always characterised by long process time, which clash with the essential criterion for obtaining must that is suitable for producing high quality white wines, that is to say that of a rapid process dictated by kinetics of the enzymatic reactions which are extremely efficient in the pre-fermentation step.

Moreover, certain separation steps of the process, like for example filtration, require long time in order to be carried out, the use of specialised labour, the use of tanks and, in the case of filtration with flooding, the use of filtration adjuvants (fossil meals and minerals). All this translates into having substantial management costs, logistic complexity, high water and energy consumption that jeopardise the "sustainability of the wine". Even the methods of separation through sedimentation or flotation are characterised by similar critical factors, i.e. use of tanks and the washing and disinfection thereof, production of solid and liquid waste.

The vinification processes of the known type thus have a series of problems and of criticalities of various nature: management of space and logistics, high production costs and high costs for managing the various processes, environmental impact both due to the large amount of water used for washing the tanks and of the production lines, and to the necessity of disposing of the adjuvants used in the filtration and clarification steps.

In addition, the most recent and increasingly more widespread methods of mechanically picking the grapes, which are rapid and efficient and that make it possible to obtain grape berries that are already without their stems, require vinification plants and processes that are just as rapid and efficient in order for the entire production chain to be correctly balanced, as well as rapidity in the processes dictated by kinetics of the enzymatic reactions that are responsible for the deterioration in terms of quality of the must, especially in the case of processing white wines, the quality of which is strongly conditioned by the pre-fermentation operations. This objective is not always achieved with conventional plants and processes for obtaining must from the grape.

The purpose of the present invention is therefore that of making a vinification plant and a process or more precisely, a plant and a process for obtaining clear must from grapes, that are capable of solving the drawbacks mentioned above of the prior art in an extremely simple, rapid, cost-effective and particularly functional manner.

In detail, one purpose of the present invention is that of making a plant and a process for obtaining clear must from grapes that are capable of reducing the number of processes and the amount of machinery used to carry out such processes, so that the plant and the production line are more compact and efficient with respect to conventional ones.

Another purpose of the present invention is that of making a plant and a process for obtaining clear must from grapes that are capable of reducing the consumption of water and of chemical substances and adjuvants used in the various processing steps, therefore leading to a lower environmental impact.

These purposes according to the present invention are achieved by making a vinification plant and process or, more precisely, a plant for obtaining clear must from grapes as outlined in the independent claims.

Further characteristics of the invention are highlighted by the dependent claims, which are an integrating part of the present description.

SUMMARY OF THE INVENTION

In brief, the process for obtaining clear must from grapes according to the present invention proposes to obtain, continuously and in a single fundamental processing step, starting from grape berries that are already destemmed or from bunches of grapes that are obtained through manual or mechanical picking methods, a must having a turbidity that is not greater than 200-300 NTU (Nephelometric Turbidity Units), or in any case lower than 1.5% by weight of suspended solids, and a solid pressed part consisting of the skin, pips, the turbid runnings separated from the must and the adjuvants used for the process. The plant according to the present invention essentially operates by means of a centrifuge separator with horizontal axis (decanter), as illustrated for example in the document of the prior art U.S. Pat. No. 5,656,180, but it is integrated with specific equipment for homogenizing and dosing adjuvants, which operate before the centrifuge treatment and that determine in a fundamental manner the performance of such a decanting centrifuge separator and of the step of clarifying through flocculation.

In all the pilot experiences it has indeed been demonstrated that the essential factors for obtaining a correct efficiency of the centrifuge process is to supply the centrifuge separator with horizontal axis (decanter) with a homogeneous mass of solids and liquid. It has also been demonstrated that obtaining a must that is separated with a level of limpidity that is lower than 200-300 NTU can be obtained exclusively if the product has undergone pre-emptive enzymatic action and, especially, if suitable doses of clarifying adjuvants are dosed before centrifugation.

Using clarification is well known and traditional in winemaking processes by using clarifying substances of different nature: animal proteins (for example: gelatine derived from cows or pigs, fish gelatine, casein, egg albumin) and more recently plants, mineral clarifying substances (for example: bentonite, silica sol and silica gel) and others. Their characteristics and their behaviour have been the object of studies in the past. The most recent studies (Ferrarini R. et al., "*Importance des charges électriques superficielles des adjuvants Œnologiques des particules et des colloïdes présents dans les moûts et les vins*", *Revue Française d'Œnologie—Cahier Scientifique*, 158, 1-10, 1996; Ferrarini R. et al., "*Messa a punto di metodi per la valutazione mediante streaming current detector delle cariche elettriche superficiali delle particelle e dei colloidi di interesse enologico*", 2nd National Congress on Food Chemistry, Giardini Naxos, 24-27 May 1995. Proceedings, 223-230, 1995) have highlighted the importance of their electric charge in the processes of clarification through sedimentation and flotation (Ferrarini R. et al., "*Recent advances in the process of flotation applied to the clarification of grape must*", *Journal Of Wine Research*, 6 (1), 19-33, 1995). However, their use has always been studied and applied exclusively in processes of clarification of musts and wines and has never been the object of study let alone of wine practice in treating directly the whole grape and/or after being pressed, that is to say on a means containing must and the solid parts of the grape (skin and pips). This element is innovative and essential for obtaining the purposes of the present invention.

The characteristics and the advantages of a plant and of a process for obtaining clear must from grapes according to the present invention shall become clearer from the following description, given as an example and not for limiting purposes, with reference to the attached schematic drawings in which the single FIGURE is a schematic view of the main components of such a plant.

With reference to the FIGURE, this shows a plant for obtaining clear must from grapes according to the present invention, wholly indicated with reference numeral 10. The plant 10 is essentially made up of at least one centrifugal separator device with horizontal axis or decanter 12 that carries out a first separating operation, through application of a centrifugal force, between the liquid phase or must and the solid phase or vinasse from the grape berries. The centrifugal separator device 12 can indeed be configured so as to directly receive the grape berries without stems. In case of the processing of grapes picked manually, the plant can be provided, upstream of the centrifugal separator device 12, of a special device 14 for destemming or pressing and destemming capable of separating the grapes from the relative stem and possibly press them. The vinasses extracted from the centrifugal separator device 12 are expelled from the plant 10 and can be treated according to procedures of the known type.

The plant 10 also comprises, downstream of the centrifugal separator device 12, at least one tank for decanting and/or flotation 16 that receives the must from such a centrifugal separator device 12 and in which there is possibly a second separating operation between the liquid part of the must and the respective solid residue or sediment. This second separating operation can be spontaneous, or it can be facilitated by using gas (nitrogen or air) injected and dissolved in line before the tank for decanting and/or flotation 16 through suitable systems, one of which is described in greater detail hereafter. In such a way it is simple to easily induce a subsequent separation of the residual solids through flotation and/or partial sedimentation. The must, possibly clarified by means of a production step that shall be described in greater detail in the rest of the description, is sent to special fermentation tanks (not shown), whereas the solid residue or sediment is expelled from the plant 10 so as to possibly undergo known types of treatment.

According to the invention, the plant 10 comprises, upstream of the centrifugal separator device 12, at least one tank 18 operatively connected to at least one device 22 for feeding at least partially intact grape berries to said plant 10. Said at least one tank 18 contains additives that are added to the grape berries when such grape berries are still at least partially intact. In particular, these additives are made up of adjuvant and/or clarifying substances and possibly also of enzymes. As an alternative, the enzymes (pectolytic enzymes) can be added also in previous processing steps, like for example during mechanical picking. This intervention is known and is often used in conventional grape processing. On the contrary, in plants and in processes known to this day, the clarifying substances (like for example gelatine, proteins, bentonite, silica gel or silica sol and others) are added only to the liquid phases (must or wine).

In detail, the tank 18 comprises a first container 18A containing the enzymes, which is operatively connected to a homogenizer device 20 that is arranged between such a tank 18 and the centrifugal separator device 12. Inside the homogenizer device 20 there is thus an addition operation of such enzymes in the product made up of grape berries that are at least partially "pressed" and of a must liquid fraction. As previously mentioned, the enzymes could also be added to the grape berries before they are introduced inside the homogenizer device 20, as illustrated in the FIGURE.

The tank 18 also comprises at least one other container 18B containing the adjuvant and/or clarifying substances, in particular made up of gelatine, proteins or cationic flocculants, which are added to the grape berries after they have come out from the homogenizer device 20 and before they have entered the centrifugal separator device 12.

The process for obtaining clear must from grapes according to the present invention is thus carried out according to the following steps. After a preliminary step of feeding the grape berries, which may or may not be destemmed, into the plant 10, there is a step of controlled addition of enzymes, which are dispensed from the first container 18A, to such grape berries while they are still in their solid phase. There is then a further step of controlled addition of adjuvant and/or clarifying substances, which are dispensed from the second container 18B, to the grape berries themselves while they are still at least partially intact.

The grape berries now with additives subsequently undergo a step of centrifugation in the centrifugal separator device 12, in such a way as to separate the liquid phase or must from the solid phase or vinasse and the turbid flocculated substance by means of the specific clarifying substances used. Both the must, and the vinasse are thus extracted and collected in respective storing recipients.

The liquid part of the clarified must is finally sent to the final fermentation step without it being necessary for there to be further processing steps. As an alternative, the must can be further and more easily clarified with other conventional processes (sedimentation, flotation, filtration, centrifugation). Again as an alternative, the must may not be intended for fermentation but rather for the production of juices or other non-fermented semi-finished products. The final result of the process according to the present invention indeed consists of a must that is already clarified and of a quality that is at least the same as that of a must which could be obtained with conventional processes. With the process according to the present invention it is moreover possible to drastically reduce the amount of sediment that is separated through sedimentation and/or flotation in the special tank 16 with respect to what occurs in conventional processes, making it possible to even recover the must from such a tank for decanting and/or flotation 16 through the centrifugal separator device 12.

Before the final fermentation step the operations carried out on the crushed grapes (white or rosé) in the vinification step promote the oxygenation of the must and can lead to its oxidation. The control of this oxygenation allows oxidative phenomena to be reduced and therefore allows the negative impact on the chemicals of the wine and, consequently, on its aromatic intensity, to be limited, while it ensures an improvement in the stability of the wine itself.

The process for obtaining clear must from grapes according to the present invention makes it possible to drastically shorten the times and the number of operations to obtain the desired level of clarification. Such shortness and simplicity of the process offers the possibility of controlling the level of oxygenation as required by using gas (normally nitrogen) in the centrifugal extraction step and in the step immediately after.

The process foresees to inject the inert gas, directly together with the crushed grapes, in inlet to the centrifugal separator device 12, in predetermined points outside of such a centrifugal separator device 12 and close to the outlet point of the clarified must (see FIGURE). Through this injection of inert gas it is possible to reduce the oxygenation of the must up to over 60%. The remaining oxygen, which may have been transferred to the must in the centrifugal extraction step, is subjected to stripping with the help of a pump 24, arranged between the centrifugal separator device 12 and the tank for decanting and/or flotation 16, equipped with a pressurization cylinder and a gas mixer. In the immediate transfer step of the must to the tank for decanting and/or flotation 16 there is thus stripping of the oxygen and, at the same time, a flotation operation is carried out for further and rapid clarification after the centrifugal extraction step.

It has thus been seen that the plant and the process for obtaining clear must from grapes according to the present invention obtain the purposes that were previously highlighted. Actually, the plant and the process according to the present invention can substitute conventional plants provided with must pressing and clarification machinery (filtration, flotation or centrifugation), eliminating the equipment and the auxiliary steps (storing in the tanks, manipulations and pauses, filtration of the sediment, refrigeration of the must, etc.). In addition, in the case in which the grape is picked mechanically, even the further destemming/press-destemming and homogenisation step can be eliminated.

The advantages of the plant and of the process according to the present invention can thus be summarised as follows: cutting down of the cost, lower environmental impact (high sustainability), advantages in the production processes of the grape coming from mechanical grape harvest (quick production in a single step, possible elimination of the destemming/press-destemming device), greater yield, lower water consumption and lower use of cooling systems, due to the fact that the process substantially occurs at room temperature and that it is only necessary to cool the already clarified must.

The plant and the process for obtaining clear must from grapes of the present invention thus conceived can in any case undergo numerous modifications and variants, all covered by the same inventive concept; moreover, all the details can be replaced by technically equivalent elements. In practice the materials used, as well as the shapes and sizes, may be any according to the technical requirements.

Finally, such a process with the suitable modifications and variants, but operating conceptually on the same principle, can be applied to separating the solid parts of the grape (skin and pips) after the oenological processes that foresee a maceration step of the white and red grapes: cold maceration, skin maceration, hot maceration, "flash détente", carbonic maceration, etc.

The scope of protection of the invention is thus defined in the attached claims.

The invention claimed is:

1. A process for obtaining clear must from grape berries, the process comprising the steps of:
   feeding grape berries into a plant;
   controlled addition of adjuvant and/or clarifying substances to said grape berries;
   centrifuging said grape berries, in such a way as to separate a liquid phase from a solid phase with at least one centrifugal separator device, the liquid phase being an entire amount of liquid removed from the grape berries fed into the plant in a tank;
   extracting and collecting the solid phase in a respective storage container;
   storing the liquid phase obtained from the grape berries fed into the plant in a tank; and
   settling and/or flotation of the liquid phase or must in the tank so that the liquid phase of said must and the solid residue are separated.

2. The process according to claim 1, wherein said adjuvant and/or clarifying substances are selected from the group consisting of gelatine, proteins and cationic flocculants.

3. The process according to claim 1, further comprising the step of controlled addition of enzymes to the grape berries, said step of controlled addition of enzymes being upstream of the step of controlled addition of adjuvant and/or clarifying substances to the grape berries.

4. The process according to claim 1, further comprising the step of destemming or crushing-destemming to separate said grape berries from the stem or to separate the grape berries from the stem and press crush the grape berries, said step of destemming or crushing-destemming being upstream of the step of controlled addition of adjuvant and/or clarifying substances to the grape berries.

5. The process according to claim 1, further comprising the step of fermenting said must, said step of fermenting being downstream of the settling and/or flotation step of the liquid phase or must.

6. The process according to claim 1, wherein the process is applied in the separation of the solid parts of the grape berries (skin and seeds) after the oenological processes that foresee a maceration step of white and red grapes.

7. The process according to claim 1, further comprising separating the grape berries from the stems or separating the grape berries from the stems and crushing the grape berries in a destemming or crushing-destemming device upstream of the at least one centrifugal separator device.

8. The process according to claim 1, further comprising the step of controlled addition of enzymes to a homogenizer tank upstream of centrifuging said grape berries.

9. The process according to claim 8, further comprising transferring contents of the homogenizer tank directly to a separator for centrifuging said grape berries.

10. A process for obtaining clear must from grape berries, the process comprising the steps of:
    feeding grape berries into a plant;
    storing the grape berries in a homogenizer tank;
    controlled addition of adjuvant and/or clarifying substances to said grape berries;
    centrifuging said grape berries, in such a way as to separate the liquid phase or must from the solid phase with at least one centrifugal separator device, the liquid phase being an entire amount of liquid removed from the grape berries fed into the plant in a tank; and
    extracting and collecting the solid phase in a respective storage container.

11. The process according to claim 10, wherein said adjuvant and/or clarifying substances are selected from the group consisting of gelatine, proteins and cationic flocculants.

12. The process according to claim 10, further comprising the step of adding enzymes to the grape berries,
    wherein said step of adding the enzymes is upstream of the step of controlled addition of adjuvant and/or clarifying substances to the grape berries.

13. The process according to claim 10, further comprising the step of destemming or crushing-destemming to separate said grape berries from the stem or to separate the grape berries from the stem and press crush the grape berries, said step of destemming or crushing-destemming being upstream of the step of controlled addition of adjuvant and/or clarifying substances to the grape berries.

14. The process according to claim 10, further comprising the step of fermenting said must, said step of fermenting being downstream of the settling and/or flotation step of the liquid phase or must.

15. The process according to claim 10, wherein the process is applied in the separation of the solid parts of the grape berries (skin and seeds) after the oenological processes that foresee a maceration step of white and red grapes.

16. The process according to claim 10, further comprising separating the grape berries from the stems or separating the grape berries from the stems and crushing the grape berries in a destemming or crushing-destemming device upstream of the at least one centrifugal separator device.

17. The process according to claim 10, wherein the step of controlled addition of adjuvant and/or clarifying substances to the grape berries is downstream of the homogenizer tank.

18. The process according to claim 10, further comprising adding enzymes to the grape berries while in the homogenizer tank.

19. A process for obtaining clear must from grape berries, comprising:
   feeding grape berries into a plant;
   adding at least one of a non-enzymatic adjuvant and clarifying substances to said grape berries;
   centrifuging said grape berries to separate the liquid phase from the solid phase, the liquid phase being an entire amount of liquid removed from the grape berries fed into the plant in a tank; and
   extracting and collecting the solid phase in a storage container.

\* \* \* \* \*